United States Patent

[11] 3,543,663

| | | |
|---|---|---|
| [72] | Inventor | Walter R. Lyon<br>West Roxbury, Massachusetts |
| [21] | Appl. No. | 720,764 |
| [22] | Filed | April 12, 1968 |
| [45] | Patented | Dec. 1, 1970 |
| [73] | Assignee | Polaroid Corporation<br>Cambridge, Massachusetts<br>a corporation of Delaware |

[54] PHOTOGRAPHIC CAMERA WITH FILM GUIDING MEANS
12 Claims, 8 Drawing Figs.

[52] U.S. Cl............................................................ 95/13, 95/89
[51] Int. Cl.......................................................G03b 17/50
[50] Field of Search............................................ 95/13, 89

[56] References Cited
UNITED STATES PATENTS
3,350,990  11/1967  Finelli et al.................. 95/13

Primary Examiner—Norton Ansher
Assistant Examiner—Alan Mathews
Attorneys—Brown and Mikulka, William D. Roberson and Leonard S. Selman ABSTRACT: A photographic camera of the self-developing type containing a film chamber having spreader apparatus therein providing a narrow gap between a pair of spreading surfaces for spreading a processing liquid between negative and positive film sheets as said sheets move through said narrow gap and out of said film chamber through a film exit opening and means for guiding said film sheets for movement through said narrow gap and out of said film chamber.

Patented Dec. 1, 1970

INVENTOR.
Walter R. Lyon
BY
Brown and Mikulka
and
Leonard S. Selman
ATTORNEYS

INVENTOR.
Walter R. Lyon
BY Brown and Mikulka
and
Leonard S. Selman
ATTORNEYS

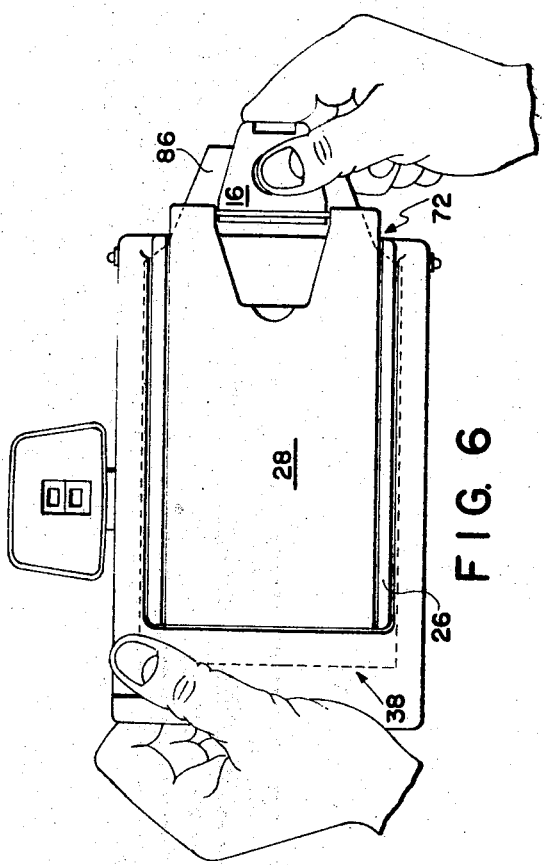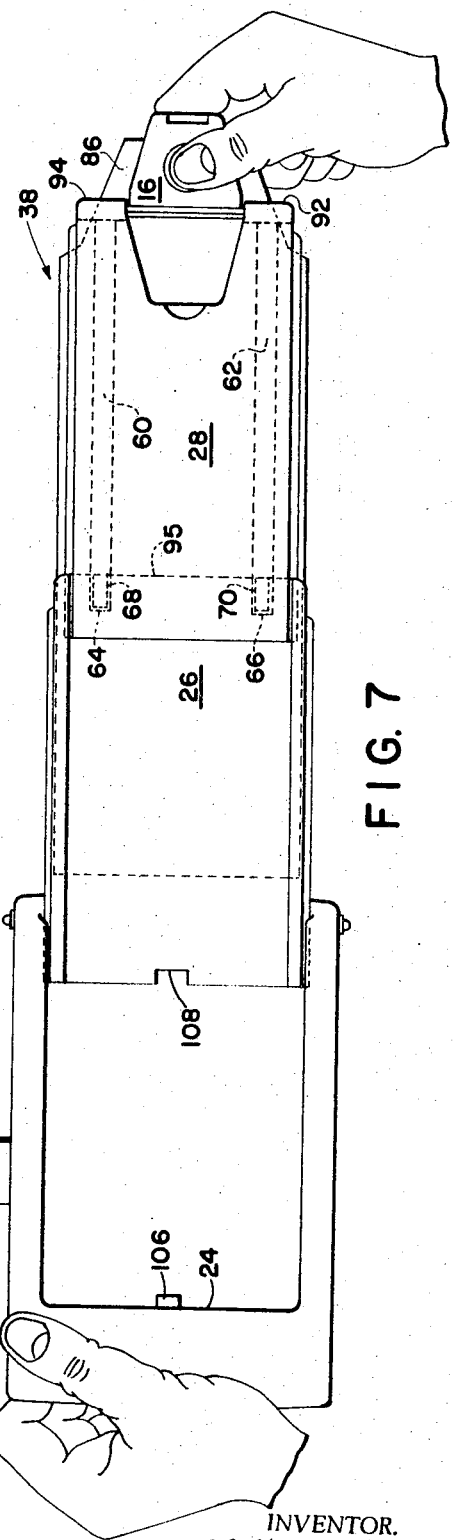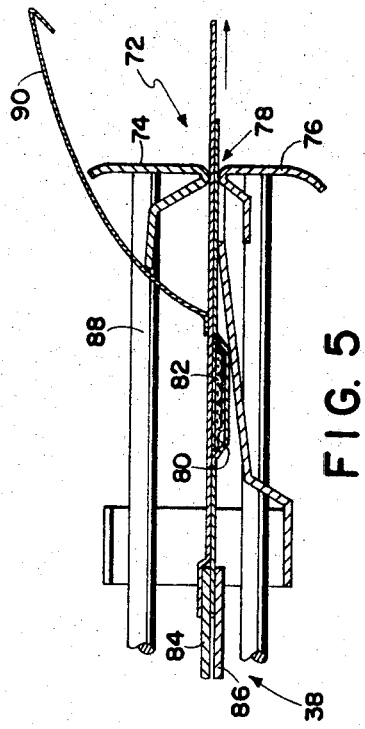

PHOTOGRAPHIC CAMERA WITH FILM GUIDING MEANS

BACKGROUND AND SUMMARY OF THE INVENTION

In many of the cameras in use today of the self-developing type, the final picture is processed outside the camera. Each film unit after exposure is manually removed from the camera film chamber through a film exit door by means of a paper leader attached thereto. U.S. Pats. Nos. 3,079,849 and 3,101,516, both assigned to the assignee of the present invention, illustrate a type of film unit with which this invention may be used, a film unit ordinarily enclosed in a film pack commercially designated as Types 107 and 108 by the manufacturer, Polaroid Corporation of Cambridge, Massachusetts. The film units for use with these cameras comprise an image-recording or negative sheet which is exposed through the camera lens, an image-receiving or positive sheet which receives the final picture image by means of diffusion transfer and a pod containing processing fluid which upon rupture of the pod is spread between the positive and negative sheets to facilitate the transfer of the picture image to the positive sheet. To rupture the pod and spread the processing liquid between the sheets, certain spreader means are provided comprising a pair of juxtaposed members having a narrow gap between them through which the film unit is manually drawn. It is important that movement of the film unit as it moves out of said film chamber through said gap follows a straight line parallel to a center line extending the length of the film sheets. If the leader is pulled at an angle to that center line, the film unit tends to become displaced angularly to its direction of travel through the gap. As a result, the processing fluid may not be spread uniformly between the sheets and may, for example, miss part of the picture area.

At the trailing end of each film unit, a pair of spacers or traps are provided which serve to widen the gap between the spreader members as the end of the film unit passes therethrough allowing any excess fluid to be left between the end portions of the film unit rather than being squeezed out to be spattered the inside of the film chamber. If one of these traps enters the gap before the other on the opposite edge of the film unit due to the angular displacement of the film relative to its direction of travel, the positive and negative sheets will tend to separate in the area near the trap with the processing fluid puddling there preventing a transfer of the picture image at the end of the picture area.

The present invention is thus directed to a means for guiding the pulling force on said film units so that they are always moved in a straight line from said film chamber and through the gap between the spreader members. The guiding means of the preferred embodiment of the invention includes a first pair of straight rails formed in the back wall of the camera's film chamber and a recess in said wall between the rails. A first plate member is slidably movable in the recess and is guided for straight line movement by the aforesaid rails. Additional straight rails are provided on the first plate member for guiding a second plate member for straight line movement as it slides over said first member. There is a lost motion connection between the first and second plate members which allows the second plate member to extend fully in a direction away from the film chamber before the first plate member begins its extending movement away from said film chamber. A puller element is connected to the end portion of the second plate member and it is located in operable position adjacent the film exit opening so that the leading end of a film unit may overlie the puller element as its extends in a position to facilitate the removal of the film unit from the film chamber. In use, the operator manually grasps the leading end of the film unit together with the puller element and while pulling the film unit from the chamber and through the gap between a pair of processing liquid spreader members, the plate elements, as first one and then the other extends in a direction away from said film chamber while sliding in their respective rails, provides a guiding motion for the film unit resulting in straight line movement of the film unit from the film chamber and through said gap.

The present invention is most suitably adapted for use with light easily portable cameras of the type that are used mostly by amateur photographers. Thus, one may recognize the advantage of a pull force guiding means built into the rear wall of the film chamber so that it lies flush with the back of the camera. The simple structure and light weight of the puller elements as well as the provision of means to fold away the puller element when not in use comprise other advantageous aspects of the invention. Further, the pull force guiding means is practically foolproof in operation so that even inexperienced persons using this type of camera are able to obtain excellent results.

Accordingly, it is an object of this invention to provide a means for guiding a film unit for movement from the film chamber of a self-developing camera. It is another object of this invention to provide a means for guiding a film unit for straight line movement upon removal of said film unit from the film chamber of a self-developing photographic camera.

It is a further object of this invention to provide a means for guiding a film unit for straight line movement through a gap between a pair of processing liquid spreader members mounted adjacent a film exit opening in the film chamber of a photographic camera.

Other objects of the invention will in part be obvious and will in part appear hereinafter.

The invention accordingly comprises the apparatus possessing the construction, combination of elements and arrangement of parts which are exemplified in the following detailed description.

BRIEF DESCRIPTION OF THE DRAWINGS

FIG. 5 is a fragmentary cross-sectional view taken along line 5-5 in FIG. 4 showing the narrow gap between the spreading surfaces through which the film is moved;

FIGS. 6 and 7 are illustrations of the invention in operation showing the withdrawing of the film unit from the film chamber.

DETAILED DESCRIPTION OF THE PREFERRED EMBODIMENT

Figure 1:
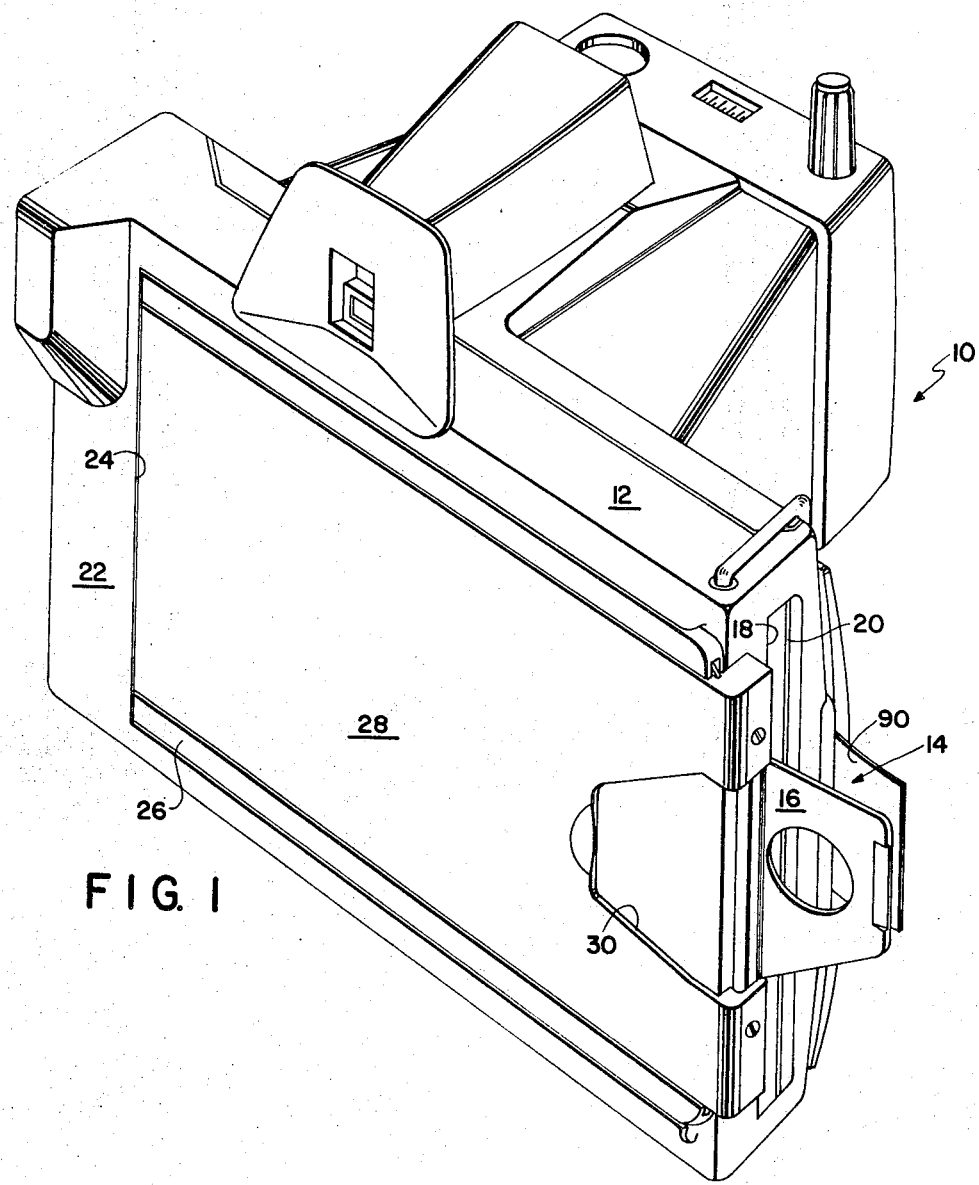
FIG. 1 is a perspective view of a photographic camera embodying the invention, showing the film movement guiding means on the rear of the film chamber.
Figure 2:
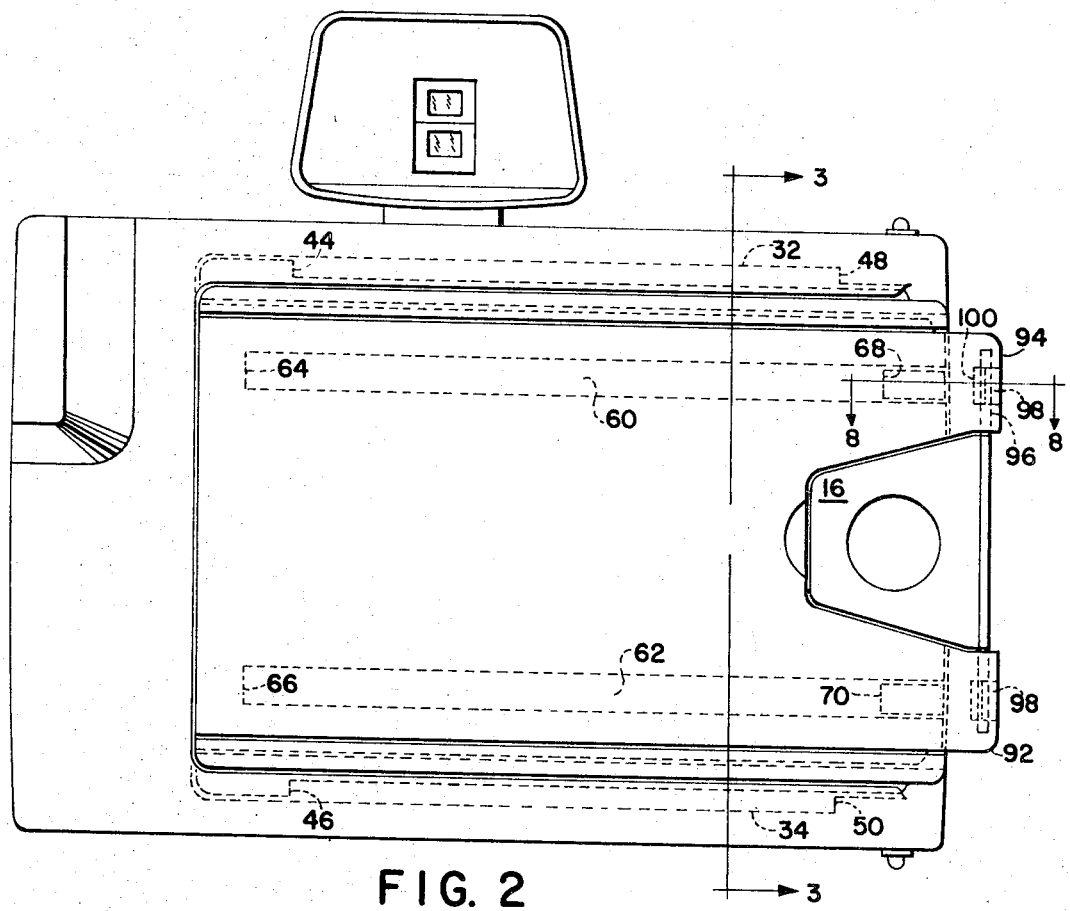
FIG. 2 is a back view of the photographic camera showing the puller element in its folded position.

Referring to the drawings and particular to FIG. 1 there is shown a self-developing photographic camera 10 having a film chamber 12 located on the back of the camera body. The means 14 for guiding the film units used with the camera for straight line movement out of the film chamber is shown in operable position with the puller element 16 extended adjacent the film exit opening 18 covered by a hinged film exit door 20. The back wall 22 of the film chamber has a recess 24 formed therein and located in said recess and lying flush with the camera back are first and second slidable thin plate members 26 and 28 respectively. The puller element 16 is connected to the second slidable plate member 28 which has an opening 30 formed therein which receives the puller element when not in use in its folded position. FIG. 2 of the drawing shows a back view of the photographic camera showing the puller element in its folded position. The straight rails and mating portions for providing the straight line movement are shown in dotted lines in FIG. 2 and in cross section in FIG. 3.

Figure 3:
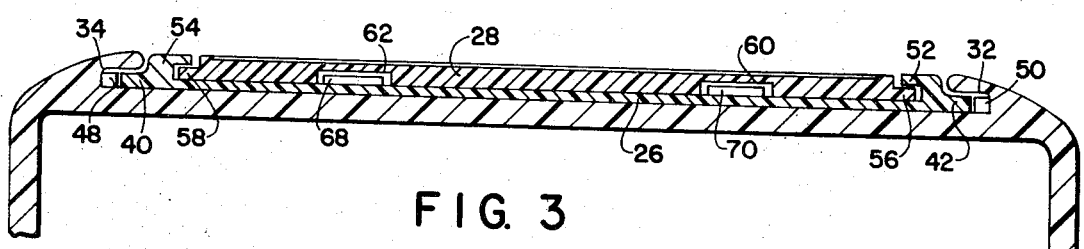
FIG. 3 is a partial cross-sectional view taken along line 3-3 in FIG. 2 and shows the rails engaging the mating portions on the slidable plate elements.
Figure 4:
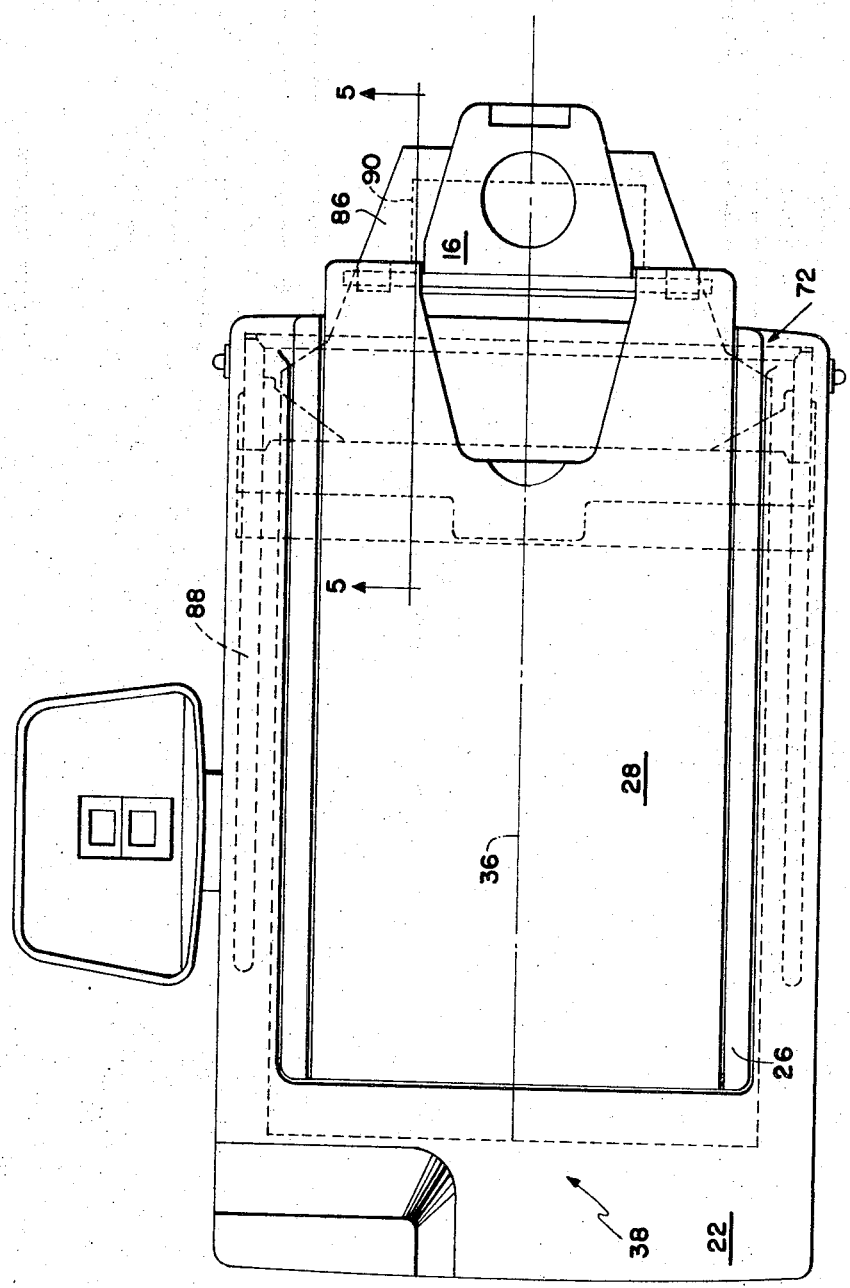
FIG. 4 is another back view of the photographic camera showing the spreader apparatus and a film unit in the film chamber.

The slidable thin plate members 26 and 28 as mentioned previously each are guided in their movement by rail means, more specifically, straight rails 32 and 34, as shown in FIGS. 2 and 3, integrally molded into the back wall of the film chamber which is composed of a moldable plastic material. These rails are perfectly straight and parallel to one another and to a center line 36 extending the length of the film units 38 as they are positioned in the film chamber as shown in FIG. 4. The plate member 26 is shown in FIG. 3 as having mating portions 40 and 42 which engage the rails 32 and 34 for sliding movement therein. The extent of the sliding movement of the plate member 26 is limited by a pair of shoulders 44 and 46 shown in FIG. 2 located at the end of mating portions 40 and 42 which engage abutments 48 and 50 at the ends of the rails. The plate member 26 also has a second pair of rails 52 and 54 formed therein for engaging the mating portions 56 and 58 of plate member 28. These rails 52 and 54 are also perfectly straight and parallel to one another and to the center line 36 extending the length of the film unit 38. The plate member 26, mating portions 40 and 42 and rails 52 and 54 form a unitary integral molded element.

In operation the plate member 28 slides over plate member 26 while being guided for straight line movement by said rails 52 and 54. Certain groove means 60 and 62 are formed within plate member 28 as shown in FIGS. 2 and 3. The end portions 64 and 66 of said groove means, are engageable with raised portions 68 and 70 on the surface of plate member 26 for transferring motion of plate member 28 to plate member 26 during operation of the device. This simple arrangement serves as a lost motion connection between the two plate members allowing plate member 28 to slide a distance directly related to the length of grooves 60 and 62 while the first plate member 26 remains stationary. When the end portions of the grooves 64 and 66 engage raised portions 68 and 70 the two plate members will then move together until stopped by abutments 48 and 50.

FIG. 4 of the drawings shows another back view of the photographic camera looking inside the film chamber, and showing in dotted lines, both a film unit 38 and the processing liquid spreader means 72. The liquid spreader means may comprise a pair of rollers or other rigid spreader members 74 and 76, such as shown in FIG. 5, having a narrow gap 78 between a pair of spreader surfaces through which the film unit 38 may be moved rupturing the processing liquid containing pod 80 and spreading the liquid 82 between the positive and negative sheets 84 and 86 of the film unit in a direction opposite that of the film unit movement. The spreader members 74 and 76 extend across the entire width of the film units and comprise a pair of sheet metal members bent to shape and mounted at each end to a pair of U-shaped springs, one of which is shown in FIG. 3 designated by reference numeral 88.

Movement is imparted to plate member 28 by means of a manually engageable portion thereon, more specifically, the puller element 16 attached thereto. The leading end 86 of the film unit 38, as shown in FIG. 6, is manually pulled out of the film chamber through the narrow gap between the spreader members 74 and 76 and out of the film exit door by means of a tab 90 shown in FIGS. 1 and 5. As shown in FIG. 6 the user grasps the puller element together with the leading end of the film unit 86 and pulls the entire film unit 38 through the gap between the spreader members 74 and 76 and out the film exit opening 18. Meanwhile, plate member 28 is extended in a direction away from said film chamber while sliding in straight rails 52 and 56 and then plate member 26 is similarly extended while sliding in straight rails 32 and 34 until both plate members are fully extended as shown in FIG. 7 with the film unit completely removed from the film chamber. Plate members 26 and 28 are returned to their closed position in said recess by manually sliding plate 26 in rails 52 and 56 until a pair of extensions 92 and 94 on plate member 26 contact the front edge 95 of plate member 28 causing both plate members to move together to their closed position within the recess. A locking means is provided for preventing the plate members from inadvertently sliding into their extended positions. The locking means comprises a raised portion 106 on the back wall of the film chamber at the end of recess 24 which extends through an opening 108 provided in the end of plate member 26. The raised portion 106 extends above the surface of plate member 26 and as the upper plate member is manually returned to the end of the recess and over the raised portion 106 the plate member 28 and especially the portions 56 and 58 mating with the end of rails 52 and 54 will be cammed upwardly against the rail surfaces increasing the frictional forces therebetween and limiting movement of the plate members.

Figure 8:
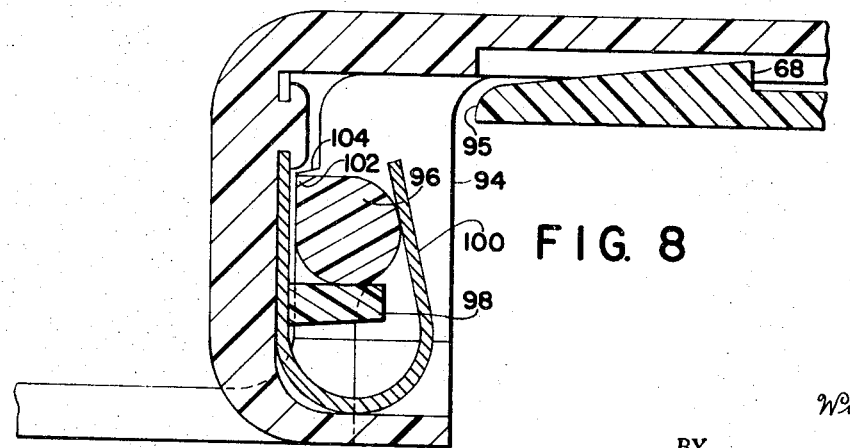
FIG. 8 is a partial cross-sectional view taken along line 8-8 in FIG. 2 showing the folding means for the puller element, with the puller element in operative position.

Additional means are provided for folding the puller element into its stored position flush with the camera back when not in use. These means include a rod member 96 formed integrally with the puller element as shown in FIG. 2 and in cross section in FIG. 8. A pair of extensions 92 and 94 integral with plate member 28 have portions for receiving said rod member 92 which may pivot about its own axis while resting against ledge 98 as shown in FIG. 8. The rod member is biased against the receiving portions by leaf spring members 100. When the puller element is pivoted into operative position, an abutment 102 on the rod member is positioned as shown in FIG. 8 so that the flange 104 on the receiving portion in cooperation with the abutment will lock said puller element in its operative position. When manually returning the puller elements to its stored position, the rod member 92 is caused to rotate in a clockwise direction causing the abutment 102 to rotate until it clears flange 104.

Since certain changes may be made in the above apparatus without departing from the scope of the invention herein involved, it is intended that all matter contained in the above description or shown in the accompanying drawings shall be interpreted as illustrative and not in a limiting sense.

I Claim:

1. A photographic camera comprising:
   a camera body containing a film chamber, a film exit opening and spreader apparatus providing a narrow gap between a pair of spreading surfaces for spreading a processing liquid between negative and positive film sheets of a film unit as said film unit moves from said film chamber;
   rail means on a back wall of said film chamber;
   film unit guiding means having mating portions engaging said rail means and slidable thereon for movement away from said film chamber;
   a puller element connected to the end portion of said film unit guiding means, said puller element being located in operable position adjacent said film exit opening so that the leading end of a film unit may overlie said puller element as it extends in a position to be removed from said film chamber whereby a user may manually grasp said leading end of said film unit together with said puller element and pull said film unit from said film chamber, the motion of said film unit guiding means as it is extended in a direction away from said film chamber while sliding on said rail means providing a guiding motion for said film unit from said film chamber and through said narrow gap between the spreader surfaces; and
   means for folding said puller element into a stored position when not in use.

2. The photographic camera of claim 1 wherein said means for folding said puller element into a stored position include means mounting said puller element for rotation between its operable position adjacent said film exit opening to its stored position.

3. The photographic camera of claim 2 wherein said means mounting said puller element for rotation includes means for locking said puller element in its operable position adjacent said film exit opening.

4. a photographic camera comprising:

a camera body containing a film chamber, a film exit opening and spreader apparatus providing a narrow gap between a pair of spreading surfaces for spreading a processing liquid between negative and positive film sheets of a film unit as said film unit moves from said film chamber through said narrow gap and out said film exit opening, the back wall of said film chamber having a first pair of rails thereon;

a first plate member slidably movable between said rails in a direction away from said film chamber said plate member having mating portions engaging said first pair of rails and being guided thereby for straight line movement;

a second pair of rails on said first plate member;

a second plate member in overlying relationship to said first plate element and slidable thereover also in a direction away from said film chamber, said second plate member having mating portions that engage said second pair of rails and are guided thereby for straight line movement;

lost motion means connecting said first and second plate members for introducing a delay between the movement of said first and second plate members and allowing said second plate member to extend in a direction away from said film chamber before said first plate member begins its extending movement away from said film chamber; and a puller element connected to the end portion of said second plate member, said puller element being located in operable position adjacent said film exit opening so that the leading end of a film unit may overlie said puller element as it extends in position to be removed from said film chamber whereby a user may manually grasp said leading end of said film unit together with said puller element and pull said film unit from said film chamber, the motion of said first and second plate elements as first one and then the other is extended in a direction away from said film chamber while sliding in their respective rails providing a guiding motion for said film unit resulting in straight line movement of said film unit from said film chamber and through said narrow gap between the spreader surfaces.

5. The photographic camera of claim 4 wherein said lost motion means connecting said first and second plate members comprise at least one groove formed in said second plate member and at least one raised portion extending from the surface of said first plate member, said raised portion located in said groove allowing said second plate member to slide a distance related to the length of said groove while said first plate means remain stationary until the end of said groove contacts said raised portion thereby connecting said first and second plate members for simultaneous movement.

6. The photographic camera of claim 4 including means for folding said puller element into a stored position when not in use and a cutout portion in said second plate member for receiving said puller element in its stored position.

7. The photographic camera of claim 6 wherein said means for folding said puller element into a stored position include means mounting said puller element for rotation between its operable position adjacent said film exit opening to its stored position.

8. The photographic camera of claim 7 wherein said means mounting said puller element for rotation includes means for locking said puller element in its operable position adjacent said film exit opening.

9. The photographic camera of claim 4 including locking means for preventing said first and second plate members from inadvertently sliding into their extended position, said locking means comprising a raised portion at the end of said recess extending through an opening in said first plate member and against said second plate member in its closed position to cam said second plate member and especially the mating portions thereof against said second pair of rails to increase the frictional forces therebetween and to thereby prevent movement of said plate members.

10. A photographic camera comprising:
a camera body containing a film chamber, a film exit opening and spreader apparatus providing a narrow gap between a pair of spreading surfaces for spreading a processing liquid between negative and positive film sheets of a film unit as said film unit moves from said film chamber through said narrow gap and out said film exit opening, the back wall of said film chamber having a first pair of straight parallel rails formed therein and a recess in said wall between said rails;

a first thin plate member slidably movable in said recess plate a direction away from said film chamber said plate member having mating portions engaging said first pair of rails and being guided thereby for straight line movement;

a second pair of straight parallel rails on said first plat member;

a second thin plate member in overlying relationship to said first plate element and slidable thereover also in a direction away from said film chamber, said second plate member having mating portions that engage said second pair of rails and are guided thereby for straight line movement;

lost motion means connecting said first and second plate members for introducing a delay between the movement of said first and second plate members and allowing said second plate member to extend fully in a direction away from said film chamber before said first plate member begins its extending movement away from said film chamber; and a puller element connected to the end portion of said second plate member, said puller element being located in operable position adjacent said film exit opening so that the leading end of a film unit may overlie said puller element as it extends in position to be removed from said film chamber whereby a user may manually grasp said leading end of said film unit together with said puller element and pull said film unit from said film chamber, the motion of said first and second plate elements as first one and then the other is extended in a direction away from said film chamber while sliding in their respective rails providing a guiding motion for said film unit resulting in straight line movement of said film unit from said film chamber and through said narrow gap between the spreader surfaces.

11. The photographic camera of claim 10 wherein said first plate member, mating portions and second plate pair of rails form a unitary integral molded element.

12. The photographic camera of claim 10 wherein said recess in said film chamber wall is of a depth approximately equal to the combined thickness of said first and second plate members so that the plate members as one overlies the other in said recess lie flush with the back wall of said film chamber.